US00RE39271E

(19) United States
(12) Reissued Patent
Crawford

(10) Patent Number: US RE39,271 E
(45) Date of Reissued Patent: Sep. 12, 2006

(54) METHOD AND APPARATUS FOR DRYING GRANULAR SOLIDS WITH VENTURI POWERED GAS CIRCULATION

(75) Inventor: Robert R. Crawford, Stafford, VA (US)

(73) Assignee: Universal Dynamics, Inc., Woodbridge, VA (US)

(21) Appl. No.: 10/382,934

(22) Filed: Mar. 7, 2003

Related U.S. Patent Documents

Reissue of:
(64) Patent No.: 6,370,797
Issued: Apr. 16, 2002
Appl. No.: 09/485,413
Filed: Feb. 10, 2000

U.S. Applications:
(60) Provisional application No. 60/088,931, filed on Jun. 11, 1998.

(51) Int. Cl.
*F26B 3/16* (2006.01)
*F26B 17/14* (2006.01)

(52) U.S. Cl. ..... 34/475; 34/169; 34/221; 34/477

(58) Field of Classification Search ..... 34/84, 34/86, 169, 219, 221, 364, 367, 377, 379, 34/514, 585, 475, 359, 467, 476, 477, 78, 34/79, 131
See application file for complete search history.

(56) References Cited

U.S. PATENT DOCUMENTS 3,708,888 A * 1/1973 Trepanier ..... 34/169
3,972,129 A * 8/1976 Graff ..... 34/32
4,022,560 A * 5/1977 Heinonen ..... 425/317
4,059,399 A * 11/1977 Cellier et al. ..... 432/121
4,247,990 A * 2/1981 Ohls et al. ..... 34/23
4,263,722 A * 4/1981 Botkins et al. ..... 34/47
4,621,437 A * 11/1986 Grande et al. ..... 34/10
4,936,025 A * 6/1990 Heikkila ..... 34/18
5,111,596 A * 5/1992 Laurenty ..... 34/57 A
5,237,757 A * 8/1993 Wiedmann et al. ..... 34/35
5,373,648 A * 12/1994 Wolf ..... 34/578
5,638,609 A * 6/1997 Chandran et al. ..... 34/365
5,809,664 A * 9/1998 Legros et al. ..... 34/347
5,926,969 A * 7/1999 Crawford et al. ..... 34/80
6,146,503 A * 11/2000 Sindzingre et al. ..... 204/164

FOREIGN PATENT DOCUMENTS

CA 97/45687 * 12/1997
JP 63041107 * 2/1988

* cited by examiner

*Primary Examiner*—Kenneth Rinehart
(74) *Attorney, Agent, or Firm*—Crowell & Moring LLP

(57) ABSTRACT

A method and an apparatus for drying plastic pellets utilizes a venturi air mover (20) in a recirculation loop communicating with a drying hopper (10) containing the plastic pellets. A portion of moist air flow in the recirculation loop is vented to the ambient atmosphere upstream of the venturi air mover. A conventional source of compressed air (16) is dried and supplied to the venturi air mover to provide the exclusive motive power for moving air through the recirculation loop.

42 Claims, 1 Drawing Sheet

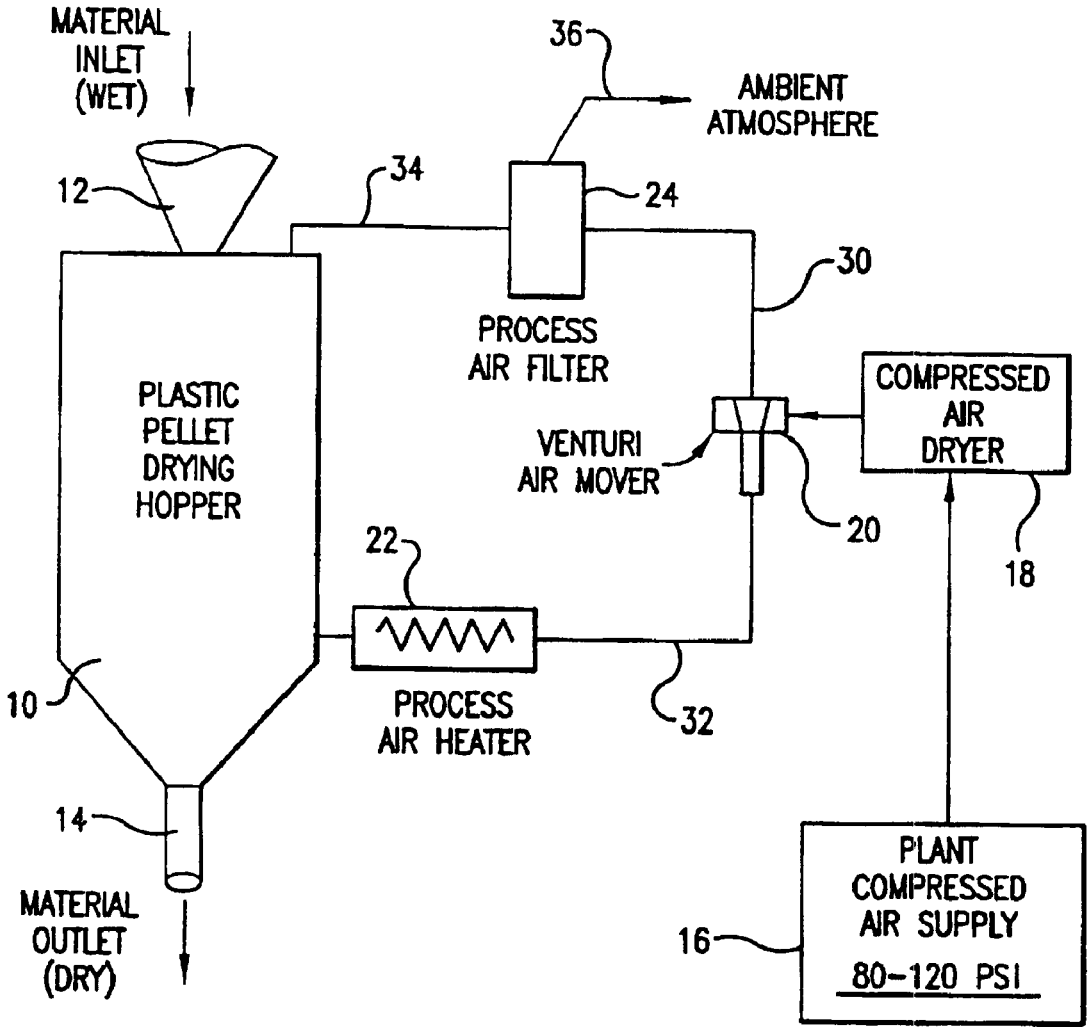
MATERIAL
INLET
(WET)
36
AMBIENT
ATMOSPHERE
12
34
24
30
PROCESS
AIR FILTER
PLASTIC
PELLET
DRYING
HOPPER
COMPRESSED
AIR
DRYER
VENTURI
AIR MOVER
20
18
22
10
PROCESS
AIR HEATER
32
14
MATERIAL
OUTLET
(DRY)
PLANT
COMPRESSED
AIR SUPPLY
80-120 PSI
16

METHOD AND APPARATUS FOR DRYING GRANULAR SOLIDS WITH VENTURI POWERED GAS CIRCULATION

Matter enclosed in heavy brackets [ ] appears in the original patent but forms no part of this reissue specification; matter printed in italics indicates the additions made by reissue.

CROSS REFERENCE TO RELATED APPLICATIONS

This application claims the benefit of U.S. Provisional Application No. 60/088,931, filed Jun. 11, 1998.

BACKGROUND OF THE INVENTION

This invention relates to a method and an apparatus for drying granular solids with venturi powdered gas circulation, and more particularly relates to a method and an apparatus for drying plastic pellets in a continuous-flow dryer using venturi powered gas circulation of dry compressed air.

The process of drying granular solids in a continuous flow is done in a conventional manner using a funnel bottom vessel in which the material to be dried is fed into the top by gravity, and is discharged from the bottom of the vessel. During the time the material is moving through the vessel, a counter flow of a drying gas is passed into the bottom of the vessel, and disperses evenly through the granular material to remove water and other volatile substances that are present in the feed stock material. Alternatively to this counter flow method, a concurrent flow of drying gas may be used, in which the drying gas is fed through the vessel in the same direction as the granular solids being fed through the vessel. The drying medium may be air or other selected gases depending on the desired interaction of the material and drying medium.

It is typical in the processing of granular plastic pellets to use very dry air or inert gases to remove the water or other volatiles (e.g. vapor phase substances emitted by the plastic) from the material. The flow of gas may come from several different methods of supply. One of the simplest is to use a continuous source of clean, dry gas. This is particularly desirable when the material to be dried off-gases volatile fractions that are not returned to the process, and can be removed or disposed of without concern as to its affect on the process if reintroduced. Since the drying process is continuous, a continuous flow of dry gas is required to process the material to be dried. The usual method to supply dry gas to the drying vessel is a process dehumidifier, which is typically a physically large device, or use the full required flow of dry compressed gas reduced to atmospheric pressure, and disposing of the gas after use. However, the use of "new" gases in most cases will render the economics of the process unsatisfactory.

In the normal construction of these devices, the gas is moved by a fan, blower, or pump to the drying vessel to remove the water and other volatiles from the process material. The gas recovered from the top of the vessel is collected since the amount of water/moisture present is far less than the water/moisture levels found in the usual atmospheric conditions. This low dewpoint air is then further dried to reduce the water/moisture content to an absolute minimum. It can then be sent back to the drying vessel to again absorb water and other volatiles from the material being processed.

In the construction of some small devices of this type, the use of dry compressed plant air utility in a manufacturing facility is done to enable the user to work with only a minimum size vessel on the next stage of the material process, and not use the recirculating gas device due to size and space constraints.

SUMMARY OF THE INVENTION

In view of the above, there is a need for an improved method and apparatus for drying granular solids which utilizes a commonly-existing plant compressed air supply.

In addition, there is a need for an improved method and apparatus for drying granular solids which has relatively low construction costs.

Furthermore, there is a need for an improved method and apparatus for drying granular solids which has relatively low operating costs.

Moreover, there is a need for an improved method and apparatus for effectively drying granular solids which has a compact construction.

These and other needs have been met according to the present invention as discussed in the following.

The present invention advantageously utilizes a commonly-existing plant compressed air utility as a drying gas source. Rather than consume the full air flow (i.e., vent all of wet gas to ambient atmosphere) as is done by the prior art to dry the granular material, a venturi is incorporated in a recirculation loop to conserve the dry air utility, and to provide the motive power for the recirculation of the drying gas without any other mechanical devices (e.g., fan, blower, pump, etc.) Since an existing compressed air supply is used, the costs of constructing the invention are relatively low.

Another advantageous aspect achieved by the present invention is that the recirculation of a portion of the wet gas advantageously reduces operating costs (e.g., the energy consumption costs of the compressed air utility), yet still maintains a relatively dry composition of the drying gas in order to efficiently and effectively remove the water and other volatiles from the feed stock material. If necessary to achieve a desired quality of dry gas supplied to the process, the compressed air utility may be dried by a conventional desiccant drying means to a dewpoint in the −40° to −80° F. range. However, the compressed air itself may be dry enough without additional drying. In the process of drying plastic pellet materials in particular, the need for a drying gas in this range is not required for the proper removal of water and other volatiles from the pellets. By experience and trial data, it is possible to dry most plastic resins with air having a 0° to −20° F. dewpoint. The present invention takes this into account by venting only a portion of the moist air leaving the drying hopper to the ambient atmosphere, and recirculating the remaining non-vented portion of that moist air in a recirculation loop. The recirculation is advantageously achieved exclusively by a venturi air mover powered by the dried compressed air from an existing plant compressed air supply, the dried compressed air being added in at a flow rate to replace the proportion of the moist air vented to the ambient atmosphere to achieve a "diluted" drying air stream having an overall quality very well suited to the above-mentioned process requirements, while advantageously minimizing energy requirements.

The instant invention conserves the amount of compressed gas used by providing a nominal dilution of the gas recirculating in the closed loop. The proportion of moist gas vented to the ambient atmosphere and replaced by dried compressed air depends upon the required design parameters of the particular application, including but not limited to the type of material being dried, the moisture content of the material being dried, the flow rate of the material being dried through the drying hopper, the size and configuration of the drying hopper, the dewpoint of the dried compressed air, the flow rate of drying gas supplied to the drying hopper, etc. For example, the proportion of the moist gas exiting the drying hopper which is vented to the ambient atmosphere (and replaced by dried compressed air) may be within the range of 5% to 50%. More preferably, in most applications for drying plastic resin pellets, the proportion of moist air vented and replaced by dried compressed air is within the range of 10% to 33%.

The use of the present invention for the plastic resin drying process is a remarkable improvement over the conventional dehumidifier for the smaller operations, in that the only devices required at the point of use for the plastic resin are a drying vessel, a gas heater and a venturi.

By using the compressed air utility and the venturi to power the recirculation loop exclusive of other mechanical means, the present invention advantageously achieves a relatively compact size.

Other objects, advantages and novel features of the present invention will become apparent from the following detailed description of the invention when considered in conjunction with the accompanying drawing.

BRIEF DESCRIPTION OF THE DRAWING

The sole drawing FIGURE shows a schematic view of a venturi-powered drying system according to a preferred embodiment of the present invention.

DETAILED DESCRIPTION OF PREFERRED EMBODIMENTS

Referring to the drawing FIGURE, a drying vessel in the form of a hopper 10 receives a granular solid material (for example, plastic pellets) to be dried via gravity flow through the wet material inlet 12 at an upper end. The plastic pellets flow downwardly through the drying hopper 10 via gravity flow against a flow of drying gas passing upwardly through the drying hopper, the drying gas entraining moisture to dry the plastic pellets. The dried plastic pellets exit the drying hopper through the dried material outlet 14.

Although the above-described preferred embodiment uses a counter flow of drying gas opposite the direction of flow of the granular solid material, a concurrent flow of a drying gas may be used, in which the drying gas is fed through the vessel in the same direction as the granular solids being fed through the vessel.

The flow of drying gas is supplied from a conventional plant compressed air supply 16, for example at a pressure of 80–120 p.s.i. Conventional compressed air is typically too wet (i.e., has too high of a dewpoint) to be used directly, so the compressed air may be dried in any conventional manner known in the art, for example via a compressed air dryer 18. Such a conventional compressed air dryer may be, for example, a pressure swing dehumidifier or a heat desorbing desiccant dryer, as are known in the art. Of course, if the compressed air is dry enough, no additional dryer is necessary.

The dried compressed air is delivered to a venturi air mover 20. As is known in the art, a venturi defines a flow cross-section which tapers toward the outlet, which increases fluid flow velocity and thereby reduces pressure at the inlet to draw fluid there through. The dried compressed air supplied to the venturi air mover 20 thereby acts exclusively as the motive power for moving the drying gas through the recirculation loop, including drawing a portion of the moist air not vented to the ambient atmosphere through line 30, to form a diluted drying gas to be supplied to the drying hopper.

The drying gas (i.e., combination of dried compressed air supplied to venturi air mover 20 and portion of moist air drawn through line 30) is supplied to a process air heater 22, which may be of any of various types known in the art, via line 32. The heated dried gas flows upwardly through the plastic pellets in the drying hopper 10, entraining and removing moisture from, the plastic pellets. The moist gas exits the drying hopper 10 via line 34, and is fed to a process air filter 24 which removes contaminants. A portion of the moist gas is bled off to the ambient atmosphere, for example at the process air filter 24 via line 36, via any means known in the art such as various valves, although this venting could be done anywhere downstream of the drying hopper 10 and upstream of the venturi air mover 20. The proportion of moist gas vented to the ambient atmosphere may be within the range of 5% to 50%, and more preferably may be within the range of 10% to 33%, particularly in most plastic pellet drying applications. As mentioned above, the proportion of moist gas vented to the ambient atmosphere and replaced by dried compressed air depends upon the required design parameters of the particular application.

The remaining portion of the moist gas which is not vented to the ambient atmosphere is drawn through the line 30 to the venturi air mover 20, where a flow of the dried compressed air is added which is equivalent to the flow of moist air being vented to the ambient atmosphere via line 36.

EXAMPLE

A typical application of the present invention to dry plastic pellets would have 5 SCFM dry compressed gas delivered to the venturi to produce a total recirculating flow of 15 SCFM. In other words, the ratio of "recirculated moist gas:dry compressed air" would be 2:1. This results in an approximate 1 kWh energy consumption for the 5 SCFM instead of the 3 kWh that would be required for a 15 SCFM gas flow where the moist gas is vented entirely to the ambient atmosphere. In the dilution of the gas, the compressed gas delivered is dried to be in the range of −40° to −50° F. dewpoint, resulting in the recirculated diluted gas having an approximately −20° F. dewpoint including the load applied by the material being processed. The −20° F. dewpoint is satisfactory for drying most of the engineered plastic resins requiring drying.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of drying plastic pellets, comprising the steps of:

providing a drying hopper with a drying gas recirculation line communicating between a drying gas inlet adjacent one end of said hopper and a drying gas outlet adjacent an opposite end of said hopper; said recirculation line having a venturi air mover arranged therein;

introducing moist plastic pellets into said hopper to be dried;

drying compressed air from a compressed air source;

introducing the dried compressed air into the venturi air mover so as to circulate and recirculate an air flow through said recirculation line and drying hopper to dry the plastic pellets;

venting a portion of moist air from said recirculation line between said drying gas outlet and said venturi air mover; and withdrawing dried plastic pellets from said drying hopper.

2. A method according to claim 1, further comprising heating the circulating air between said venturi air mover and said drying gas inlet.

3. A method according to claim 1, wherein said air is passed through said drying hopper countercurrently to said plastic pellets.

4. A method according to claim 1, wherein said compressed air is dried to a dew point between −40 and −80° F. before introduction into said venturi air mover.

5. A method according to claim 1, wherein the compressed air is introduced into said venturi air mover at a pressure in the range from 80 to 120 psi.

6. A method according to claim 1, wherein the compressed air is dried in a desiccant dryer or a pressure swing dehumidifier.

7. A method according to claim 1, wherein said venturi air mover is the exclusive source of motive power for circulating said air flow.

8. A method according to claim 1, wherein in said compressed air introducing step said dried compressed air is supplied at a flow equivalent to said vented portion of moist air.

9. A method according to claim 7, wherein in said compressed air introducing step said dried compressed air is supplied at a flow equivalent to said vented portion of moist air.

10. A method according to claim 3, wherein said vented portion is within the range of 5% to 50% of said moist air flow.

11. A method according to claim 3, wherein said vented portion is within the range of 10% to 33% of said moist air flow.

12. A method of drying plastic pellets, comprising the steps of:

providing a drying hopper with a drying gas recirculation line communicating between a drying gas inlet adjacent one end of said hopper and a drying gas outlet adjacent an opposite end of said hopper; said recirculation line having a venturi air mover arranged therein;

introducing moist plastic pellets into said hopper to be dried;

introducing dry compressed air having a dew point between −40 and −80° F. from a compressed air source into the venturi air mover so as to circulate and recirculate air through said recirculation line and drying hopper to dry the plastic pellets;

heating the circulating air between said venturi air mover and said drying gas inlet;

venting a portion of moist air from said recirculation line between said drying gas outlet and said venturi air mover; and withdrawing dried plastic pellets from said drying hopper;

wherein said air is passed through said drying hopper countercurrently to said plastic pellets.

13. An apparatus for drying plastic pellets comprising:

a drying hopper with a drying gas recirculation line communicating between a drying gas inlet adjacent one end of said hopper and a drying gas outlet adjacent an opposite end of said hopper;

said recirculation line having a venturi air mover arranged therein;

said hopper having an inlet for introducing moist plastic pellets into the hopper to be dried;

a compressed air source connected to said venturi air mover for introducing compressed air into the venturi air mover to circulate and recirculate an air flow through said recirculation line and said drying hopper to dry plastic pellets therein;

an air dryer for drying the compressed air prior to introduction into the venturi air mover, a vent in said recirculation line between said drying gas outlet and said venturi air mover for venting a portion of moist air from said recirculation line; and a pellet outlet on said hopper for discharging dried plastic pellets therefrom.

14. An apparatus according to claim 13, further comprising a heater on said recirculation line between said venturi air mover and said drying gas inlet for heating air circulating therethrough.

15. An apparatus according to claim 13, wherein said drying gas inlet and said pellet outlet are at one end of the drying hopper and the pellet inlet and the drying gas outlet are at the other end of the drying hopper so that air passes through said drying hopper countercurrently to said plastic pellets.

16. An apparatus according to claim 13, wherein the air dryer comprises a desiccant dryer or a pressure swing dehumidifier.

17. An apparatus according to claim 13, wherein said venturi air mover is the exclusive source of motive power for circulating said air flow.

18. An apparatus according to claim 17, wherein said dried compressed air is supplied at a flow equivalent to said vented portion of moist air.

19. An apparatus according to claim 13, wherein said dried compressed air is supplied at a flow equivalent to said vented portion of moist air.

20. An apparatus according to claim 19, wherein said vented portion is within the range of 5% to 50% of said moist air flow.

21. An apparatus according to claim 19, wherein said vented portion is within the range of 10% to 33% of said moist air flow.

*22. A method of drying plastic pellets, comprising the steps of:*

*providing a drying hopper with a drying gas recirculation line; said recirculation line having a venturi air mover arranged therein;*

*introducing moist plastic pellets into said hopper to be dried;*

*drying compressed air from a compressed air source;*

*introducing the dried compressed air into the venturi air mover so as to circulate and recirculate an air flow through said recirculation line and drying hopper to dry the plastic pellets;*

*venting a portion of moist air; and*

*withdrawing dried plastic pellets from said drying hopper.*

*23. A method according to claim 22, further comprising heating the circulating air between said venturi air mover and said drying gas inlet.*

*24. A method according to claim 22, wherein said air is passed through said drying hopper countercurrently to said plastic pellets.*

*25. A method according to claim 22, wherein said compressed air is dried to a dew point between −40 and −80° F. before introduction into said venturi air mover.*

*26. A method according to claim 22, wherein the compressed air is introduced into said venturi air mover at a pressure in the range from 80 to 120 psi.*

*27. A method according to claim 22, wherein the compressed air is dried in a desiccant dryer or a pressure swing dehumidifier.*

*28. A method according to claim 22, wherein said venturi air mover is the exclusive source of motive power for circulating said air flow.*

*29. A method according to claim 22, wherein in said compressed air introducing step said dried compressed air is supplied at a flow equivalent to said vented portion of moist air.*

*30. A method according to claim 28, wherein in said compressed air introducing step said dried compressed air is supplied at a flow equivalent to said vented portion of moist air.*

*31. A method according to claim 24, wherein said vented portion is within the range of 5% to 50% of said moist air flow.*

*32. A method according to claim 24, wherein said vented portion is within the range of 10% to 33% of said moist air flow.*

*33. A method of drying plastic pellets, comprising the steps of:*

*providing a drying hopper with a drying gas recirculation line; said recirculation line having a venturi air mover arranged therein;*

*introducing moist plastic pellets into said hopper to be dried;*

*introducing dry compressed air having a dew point between −40 and −80° F. from a compressed air source into the venturi air mover so as to circulate and recirculate air through said recirculation line and drying hopper to dry the plastic pellets;*

*heating the circulating air between said venturi air mover and said drying gas inlet;*

*venting a portion of moist air; and*

*withdrawing dried plastic pellets from said drying hopper;*

*wherein said air is passed through said drying hopper countercurrently to said plastic pellets.*

*34. An apparatus for drying plastic pellets comprising:*

*a drying hopper with a drying gas recirculation line;*

*said recirculation line having a venturi air mover arranged therein;*

*said hopper having an inlet for introducing moist plastic pellets into the hopper to be dried;*

*an air dryer for drying the compressed air prior to introduction into the venturi air mover for circulating and recirculating an air flow through said recirculation line and said drying hopper to dry plastic pellets;*

*a vent that vents a portion of moist air; and*

*a pellet outlet on said hopper for discharging dried plastic pellets therefrom.*

*35. An apparatus according to claim 34, further comprising a heater on said recirculation line between said venturi air mover and said drying gas inlet for heating air circulating therethrough.*

*36. An apparatus according to claim 34, wherein said drying gas inlet and said pellet outlet are at one end of the drying hopper and the pellet inlet and the drying gas outlet are at the other end of the drying hopper so that air passes through said drying hopper countercurrently to said plastic pellets.*

*37. An apparatus according to claim 34, wherein the air dryer comprises a desiccant dryer or a pressure swing dehumidifier.*

*38. An apparatus according to claim 34, wherein said venturi air mover is the exclusive source of motive power for circulating said air flow.*

*39. An apparatus according to claim 38, wherein said dried compressed air is supplied at a flow equivalent to said vented portion of moist air.*

*40. An apparatus according to claim 34, wherein said dried compressed air is supplied at a flow equivalent to said vented portion of moist air.*

*41. An apparatus according to claim 40, wherein said vented portion is within the range of 5% to 50% of said moist air flow.*

*42. An apparatus according to claim 40, wherein said vented portion is within the range of 10% to 33% of said moist air flow.*

* * * * *